Dec. 2, 1958  J. MERCIER ET AL  2,862,513
BLEEDER VALVE
Original Filed March 31, 1953
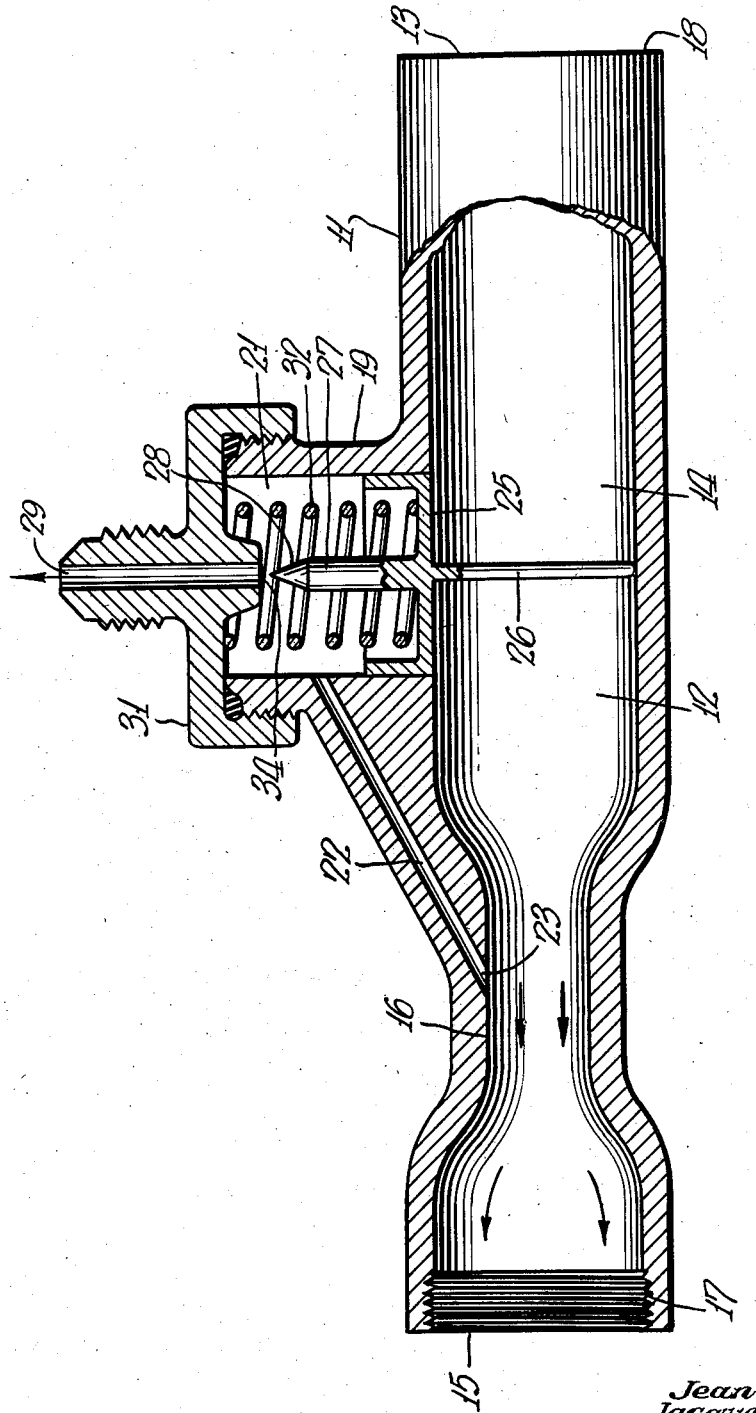
INVENTORS
Jean Mercier
Jacques H. Mercier
BY
Dean Fairbank + Hirsch
ATTORNEYS

United States Patent Office 2,862,513
Patented Dec. 2, 1958

2,862,513

BLEEDER VALVE

Jean Mercier and Jacques H. Mercier, New York, N. Y.

Original application March 31, 1953, Serial No. 345,986, now Patent No. 2,772,690, dated December 4, 1956. Divided and this application June 1, 1956, Serial No. 588,819

4 Claims. (Cl. 137—117)

This invention relates to the art of valves, more particularly of the type to provide bleeding under predetermined conditions of operation from the output line of a pump delivering fluid under pressure.

Where the proportion of gas to liquid delivered by a fluid pump is so high that if fed to a hydraulically operated unit, malfunctioning thereof might result, serious consequences may occur especially where the unit controls the brakes of a vehicle, for example.

It is accordingly among the objects of the invention to provide a bleeder valve that is compact, relatively simple in construction, having but few parts that are not likely to become deranged, which may readily be manufactured by mass production methods, and which will automatically and dependably bleed fluid from a fluid pressure line when the proportion of liquid to gas in such line is below a predetermined amount and when the proportion of liquid to gas exceeds such amount will quickly stop further bleeding action.

Another object is to provide a valve of the above type which will bleed accumulated gas from a pressure system with substantially no interference with its normal operation.

According to the invention, the valve comprises a casing having an inlet, an outlet and a bleeder port. The bleeder port is controlled by a valve member associated with the bleeder port and normally retaining the latter open and in communication with the inlet for bleeding of gas from the valve.

The valve member is normally retained in open position until the rate of flow of the fluid forced into the inlet rises above a predetermined amount, at which time, by means of venturi action, the valve member will move to closed position.

This application is a division of copending application Serial No. 345,986, filed March 31, 1953, now Patent No. 2,772,960, dated December 4, 1956, which in turn is a continuation-in-part of abandoned application Serial No. 648,711, filed February 19, 1946.

In the accompanying drawing in which is shown one of various possible embodiments of the several features of the invention, the single figure is a longitudinal cross sectional view of the valve in horizontal position.

Referring now to the drawings, the bleeder valve desirably comprises a substantially cylindrical casing 11 having a bore or passageway 12 therethrough with a liquid inlet 13 at one end, a bleeder section 14 and a liquid outlet 15 at the other end, the casing being of reduced diameter as at 16 adjacent the liquid outlet 15.

The valve is designed for use in a system through which flows fluid under pressure, and desirably is internally threaded at each end as at 17 and 18, for ready connection in a fluid line.

The bleeder section of the valve desirably comprises a substantially cylindrical boss 19 extending radially outward from the casing and having an enlarged bore 21 leading into the casing passageway 12, the bore 21 desirably being in communication with the reduced portion 16 of the casing passageway 12 by means of an inclined duct 22 having its inlet 23 in said reduced portion and its outlet in bore 21.

Slidably mounted in bore 21 is a piston 25, desirably cup-shaped as shown, which may have a depending pin 26 rigid therewith to abut against the casing wall to limit the downward movement of said piston. The piston desirably has an axial stem 27 rising therefrom, having a conical tip 28 at its free end, defining a valve head which is normally retained spaced from an axial bore 29 of relatively small diameter, in a cap 31 threaded on the outer end of boss 19, by means of a coil spring 32 compressed between the piston 25 and cap 31.

When the casing 11 is interposed, for example, in a line leading from a pump, and the pump is started, as the initial pumping action may force both liquid and gas into the casing 11, in spite of the reduced portion 16, the rate of flow of the liquid past the inlet 23 of duct 22 will initially be relatively low and hence the venturi action caused by such flow will be negligible and the pressure exerted against opposed faces of the piston 25 will be substantially equal and the spring 32 will retain valve head 28 spaced from the inner end 34 of bore 29.

Due to the natural tendency of gas such as air to rise in a liquid, appreciable separation will occur and such air will pass through duct 22 and bores 21 and 29 for discharge to the atmosphere.

As the direction of flow of liquid is substantially opposite to the inclination of duct 22, little or no liquid will enter the latter and substantially only the air in the liquid will be discharged from bore 29.

As the pump operation continues, the quantity of air forced from its output will be reduced and the rate of flow of the liquid will increase. Assuming that the pressure in the liquid inlet 13 and the bleeder section 14 of the casing is 100 p. s. i., such pressure will also be exerted against the undersurface of piston 25. If the increased rate of flow of the fluid, due to the restricted portion 16, is such that the pressure therein drops to 50 p. s. i., such pressure will also be exerted on the contents of bore 21 and hence against the upper surface of piston 25. As a result there will be a differential pressure of 50 p. s. i. exerted in an upward or valve-closing direction against piston 25 which will overcome the force exerted by spring 32 and the atmosphere pressure through bore 29 against the contents of bore 21 and hence against the piston. Consequently, the resultant upward thrust on the piston 25 will move the valve head 28 to close the inner end 34 of bore 29.

With the construction above described, as long as the rate of flow of liquid is high enough to reduce the pressure against the contents of bore 21 to overcome the normal effect of spring 32 and the atmosphere pressure, valve head 28 remains closed with the result that all of the liquid forced into the casing 11 will flow into the hydraulic system.

If a sufficient quantity of gas should be forced by the pump into the casing 11 to reduce the rate of flow below that required to reduce the pressure on the contents of bore 21 sufficiently to overcome spring 32 and the atmospheric pressure, valve head 28 would again open to permit bleeding from the casing 11.

It is apparent therefore that automatic control of the bleeding action is provided by the valve to prevent an excessive amount of gas in the hydraulic system which might cause malfunctioning of the equipment to be operated.

As many changes could be made in the above construction, and many apparently widely different embodiments of this invention could be made without departing from the scope of the claims, it is intended that all matter contained in the above description or shown in the accompanying drawing shall be interpreted as illustrative and not in a limiting sense.

Having thus described our invention, what we claim as new and desire to secure by Letters Patent of the United States is:

1. A bleeder valve construction comprising a casing having a passageway therethrough with a liquid inlet at one end, a liquid outlet at the other end and a bleeder section therebetween having a discharge bore of diameter smaller than that of said liquid outlet, a valve controlling said discharge bore, resilient means normally retaining said valve in open position with respect to said discharge bore, said casing passageway having adjacent portions of different diameters whereby the fluid flowing through said portions will, as the flow velocity therethrough increases, create a differential pressure in said portions, a reciprocable member controlling said valve, said reciprocable member having one side thereof exposed to the higher pressure created in the larger of said portions, means associated with the smaller of said portions to create a Venturi effect to provide a lower pressure against the other side of said reciprocable member, said reciprocable member being movable against said resilient means when the difference between said pressures exceeds a predetermined amount to overcome the force of said resilient means, thereby moving said valve to close said discharge bore.

2. The combination set forth in claim 1 in which said bleeder section comprises a bore in communication at one end with said casing passageway and extending at right angles thereto, said discharge bore being at the other end of said bleeder section bore, a piston slidably mounted in said bleeder section bore and controlling said valve, said piston having one surface exposed to the passageway, said resilient means reacting against said piston to urge the latter toward said passageway, means to limit the movement of said piston toward said passageway and the means to expose the other side of the piston to the lower pressure comprises a duct leading from the smaller diameter portion of said passageway into said bleeder section bore.

3. The combination set forth in claim 2 in which said duct is inclined so as to provide an acute angle at the end thereof leading into said casing passageway.

4. The combination set forth in claim 2 in which said resilient means is a coil spring.

References Cited in the file of this patent

UNITED STATES PATENTS

| | | |
|---|---|---|
| 104,593 | Hovey | June 21, 1870 |
| 277,189 | Atwell | May 8, 1883 |
| 323,992 | Wilcox | Aug. 11, 1885 |
| 358,148 | Desmond | Feb. 22, 1887 |
| 1,440,808 | Wineman | Jan. 2, 1923 |
| 1,478,600 | Denspel | Oct. 16, 1923 |
| 1,553,940 | Kangieser | Sept. 15, 1925 |
| 1,775,362 | Demarcus | Sept. 9, 1930 |
| 1,908,357 | Hornschurch | May 9, 1933 |
| 1,934,758 | Temple | Nov. 14, 1933 |
| 2,034,914 | Lanser | Mar. 24, 1936 |
| 2,061,517 | Kenny | Nov. 17, 1936 |
| 2,108,272 | Seyforth | Feb. 15, 1938 |
| 2,152,695 | Hornschurch | Apr. 4, 1939 |
| 2,157,596 | Davis | May 9, 1939 |
| 2,223,699 | Norgren | Dec. 3, 1940 |
| 2,231,341 | Lichte | Feb. 11, 1941 |
| 2,318,962 | Parker | May 11, 1943 |
| 2,394,987 | Deming | Feb. 19, 1946 |
| 2,397,664 | Hillier | Apr. 2, 1946 |
| 2,399,996 | Fitch | May 7, 1946 |
| 2,503,424 | Snyder | Apr. 11, 1950 |

FOREIGN PATENTS

| | | |
|---|---|---|
| 128,891 | Great Britain | July 3, 1919 |
| 25,388 | Australia | Nov. 20, 1930 |